May 19, 1970     A. J. REED ET AL     3,512,768
FLEXIBLE TRANSMISSION COUPLINGS

Filed Dec. 13, 1967     2 Sheets-Sheet 1

ALUN JOHN REED,
GWYNNE BOWEN,
INVENTORS

BY Stephen H. Frisley
ATTORNEY

United States Patent Office 3,512,768
Patented May 19, 1970

3,512,768
FLEXIBLE TRANSMISSION COUPLINGS
Alun John Reed, and Gwynne Bowen, Leicester, England, assignors to Metalastik Limited, Leicester, England, a British company
Filed Dec. 13, 1967, Ser. No. 690,205
Claims priority, application Great Britain, Dec. 14, 1966, 55,912/66
Int. Cl. F16f 15/12
U.S. Cl. 267—1                                           5 Claims

ABSTRACT OF THE DISCLOSURE

A torque transmission coupling comprising spiders drivably connected by metal interleaved rubber springs has the rubber springs stabilised radially to allow for an increase in torsional flexibility of the coupling in at least one direction of rotation.

---

Figure 1:
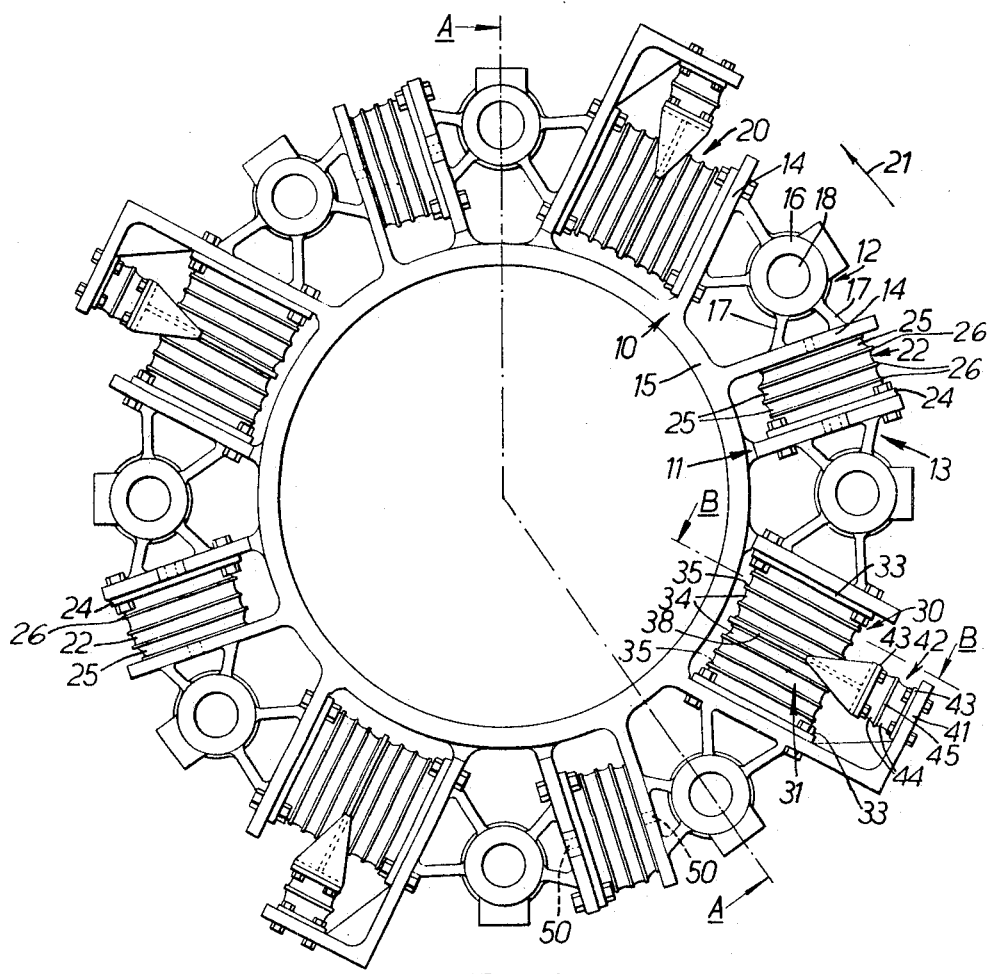

This invention relates to flexible transmission couplings more particularly but not exclusively for marine propulsion installations with variable pitch propellers.

Couplings according to the present invention are, however, suitable for other applications.

An object of the present invention is to provide a construction of torque transmission coupling having a good flexibility at least for the transmission of torque in one direction of rotation and which is easily and cheaply produced.

Another object of the present invention is to provide a coupling having a uniform stiffness at least for the transmission of torque in said one direction.

A torque transmission coupling according to the present invention is of the kind (hereinafter referred to as of the kind described) comprising a pair of spiders or flanges each formed with or carrying abutments arranged circumferentially of the coupling with alternate abutments on one flange or spider respectively and rubber spring means disposed between each adjacent pair of the abutments to transmit torque between the driving and driven spiders or flanges, in use of the coupling, solely by compression in the rubber.

According to the present invention, the rubber spring means of at least one set of alternate rubber spring means, which transmit torque in one direction in use of the coupling, each incorporate a number of flat interleaves, and means is provided anchoring to one of the spiders or flanges against movement radially outwardly of the coupling an intermediate one of the interleaves, the anchoring means permitting at least limited movements of the intermediate interleaf in circumferential directions of the coupling.

Preferably, the anchoring means comprises a rubber spring mounting arranged to resist radial outward movement of the interleaf in compression in the rubber and to permit limited movements of the interleaf in circumferential directions of the coupling in translational shear.

Preferably also, the intermediate interleaf is formed by a stabilising plate which is separate of the rubber spring means, the rubber spring means being in two parts disposed on either side of the stabilising plate, which parts abut the stabilising plate when torque is being transmitted in said one direction in use of the coupling, the spring means being free of compressive strain when the coupling is at rest.

By anchoring an intermediate interleaf of the spring means of one set of alternate rubber spring means, which transmit torque in one direction in use of the coupling, sufficient interleaves may be incorporated in the spring means and the spring means may be made of sufficient length in the circumferential direction for the coupling to give the required flexibility for driving in said one direction whilst not introducing lateral instability of the spring means under the combined action of compression loading and centrifugal force in use of the coupling.

Figure 2:
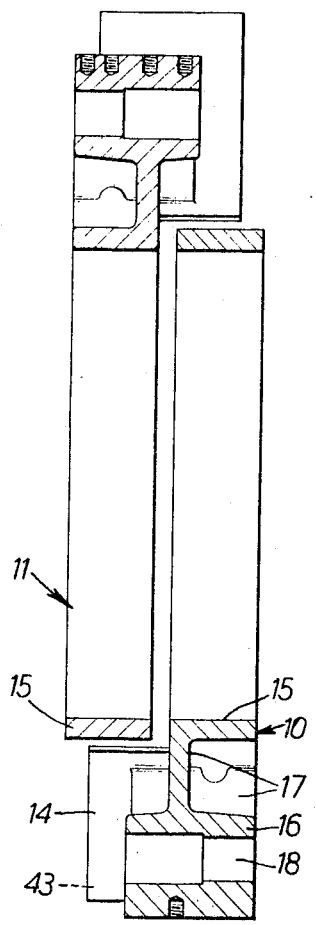
Figure 3:
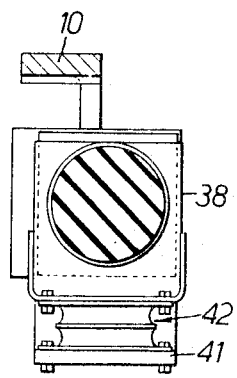

A specific embodiment of the present invention will now be described by way of example with reference to the accompanying drawings in which:

FIG. 1 is a front elevation of a torque transmission coupling according to the present invention,
FIG. 2 is a cross section along line A—A in FIG. 1,
FIG. 3 is a view on line B—B in FIG. 1.

Referring to the drawings, the coupling comprises two cast spiders 10 and 11 each provided with four equi-angularly spaced abutments, those on the spider 10 being indicated at 12 and those on the spider 11 at 13.

Each abutment is made up of a circumferentially spaced pair of abutment plates 14 projecting outwardly from an inner ring part 15 which carries all the abutments on the one casting, and a bored boss 16 carried between the plates by struts 17. The bosses 16 have bolt holes 18 for bolting the coupling into a transmission e.g. between driving and driven flanges.

The abutments 12, 13 are disposed circumferentially of the coupling with each adjacent pair of abutments 12, 13 one on one spider and the other on the other spider respectively. The abutment plates 14 are arranged in parallel, interfacing pairs and between each pair is disposed a rubber spring means. The rubber spring means are in two sets arranged alternately, the springs of one set, indicated each by the reference numeral 20, transmitting torque in the forward drive direction indicated by the arrow 21 between the driving spider 10 and the driven spider 11, and the springs of the other set, indicated by the reference numeral 22, transmitting torque in the reverse drive direction.

The reverse drive spring means 22 each comprise one end plate 24 bolted to one of the interfacing pair of plates 14 between which the spring is disposed, the spring being made up of four rubber pads 25 with three flat metal interleaves 26 bonded between the pads, the rubber pad 25 remote from the end plate 24 having one exposed flat face which abuts the other of the pair of plates 14 to transmit reverse drive during reverse drive of the coupling wholly in compression in the spring means 22. In the example being described, the spring means 22 are bolted to the spider 11.

The forward drive spring means 20 are each in two parts indicated respectively by the reference numerals 30 and 31 each having an end plate 33 bolted to one of the interfacing pair of plates 14 between which the spring is disposed, each part 30, and 31, being made up of four rubber pads 34 with three flat metal interleaves 35, the rubber pad remote from the end plate in each part having one exposed flat face which abuts one side of a stabilising plate 38 disposed between the parts 30 and 31 to transmit forward drive during forward drive of the coupling wholly in compression in the spring means 20.

One of the plates 14 of each interfacing pair of plates 14 embracing a forward drive spring means 20 is outwardly and then circumferentially extended to form a bracket 41 which mounts an anchoring means in the form of a rubber mounting 42 comprising end plates 43 and a pair of rubber pads 44 separated by an interleaf 45. The end plates 43, the pads 44 and the interleaves 45 are of elongated rectangular form as shown in FIG. 3 having their major dimension extending axially of the coupling.

The rubber mountings 42 are carried one by each of the brackets 41 so as to lie between the bracket and the adjacent spring means 20 with the interleaves and end plates of the mountings disposed normal to the stabilising plates 38.

The stabilising plates are rigidly attached to the radially inner end plates 43 of the mountings 42 by suitable brackets on the stabilising plates.

In operation of the coupling, during forward drive, the spiders rotate relatively to one another, the spider 10 moving counter-clockwise in FIG. 1 relative to the spider 11 as indicated by the arrow 21, the relative rotation being taken up by deflection of the spring means 20. Thus each spring means 20 is compressed to transmit the forward drive and the parts 30 and 31 thereof frictionally grip the interposed stabilising plate 38. At the same time, the free ends of the spring means 22 move out of contact with their adjacent abutment plates 14.

As the speed of rotation increases, the inner ends of the parts 30 and 31 of each spring means 20 tend to move radially outwardly under the action of centrifugal force. Also, as the torque transmission rises, the spring means 20 tend to become more and more unstable transversely due to a reduction in the transverse shear stiffness of the springs which, at the maximum compressive loading on the springs, may be negative.

These effects, however, are counteracted by the stabilising plate 38 which is anchored against outward radial movement by its rubber mounting 42. The mounting resists outward radial movement of the stabilising plate in compression in the rubber of the rubber pads 44 of the mounting pads so that outward radial movements are substantially wholly prevented, the rubber being very stiff in compression.

However, the mounting permits limited movements of the stabilising plate normal to the plane of the plate, that is to say in circumferential directions of the coupling, relatively freely since the rubber of the mounting is then deflected in translational shear. The stabilising plate is, therefore, free to move circumferentially to follow the deflection of the spring means 20 in compression during the transmission of forward drive.

Reverse drive is effected through the spring means 22, deflection of which in compression causes the adjacent ends of the parts 30 and 31 of the spring means 20 to move out of contact with the stabilising plates 38.

The coupling as described has a uniform stiffness forward drive characteristic and a uniform stiffness reverse drive characteristic. The forward drive stiffness is relatively low compared with the reverse drive stiffness due to the lower stiffness characteristic of the spring means 20 in compression compared with the spring means 22.

The spiders are machined from identical castings and the rubber spring means 20, 22 and the rubber mountings 42 may all be standard, bonded units. An inexpensive construction of coupling is accordingly achieved.

The stabilising plates 38 may have an additional bonded-on pad or pads of rubber to engage one of or both the parts 30 and 31 of the spring means 20.

Bolt holes 50 are provided for temporarily bolting the spiders 10 and 11 together during transportation and assemblage of the coupling into a transmission.

We claim:
1. A transmission coupling comprising:
   driving and driven, substantially circular, spider members, each having at least one substantially radially extending abutment; and
   at least one rubber spring means disposed between an abutment of said driving spider and an abutment of said driven spider to transmit torque in a given direction between the driving and driven spiders solely by compression in the rubber,
   characterized in that said at least one rubber spring means includes:
   a plurality of rubber bodies interleaved with a plurality of substantially flat interleaves; and
   means coupled to one of said spiders for anchoring an intermediate one of said interleaves against radially outward movement during operation of said coupling, said anchoring means permitting at least limited movement of said anchored intermediate interleave in the circumferential direction of said coupling.

2. A coupling as claimed in claim 1 wherein the anchoring means comprises a rubber spring mounting arranged to resist radial outward movement of the anchored intermediate interleaf in compression in said rubber spring mounting and to permit limited movement of the anchored intermediate interleaf in circumferential directions of the coupling in translational shear.

3. A coupling as claimed in claim 1 wherein said anchored intermediate interleaf is formed by a stabilizing plate which is separate of the rubber spring means and wherein the rubber spring means is in two sections, said two sections being disposed on opposite sides of said stabilizing plate, said two sections abutting said stabilizing plate when torque is being transmitted during operation of the coupling, the spring means being free of compressive strain when the coupling is at rest.

4. A coupling as claimed in claim 2 wherein said rubber spring mounting includes a rubber spring having at least two rubber bodies with an interleaf therebetween, one end of said rubber spring being coupled to said one of said spiders and the other end of said spring being coupled to said anchored intermediate interleaf.

5. A coupling as claimed in claim 4 wherein said interleaf in said rubber spring mounting extends substantially circumferentially of said spiders, the anchored intermediate interleaf extending substantially perpendicularly to said circumferentially extending interleaf.

References Cited

UNITED STATES PATENTS 2,352,586   6/1944   Kilborn et al. _____ 267—57.1

FOREIGN PATENTS 182,097   1/1963   Sweden.

JAMES B. MARBERT, Primary Examiner